United States Patent Office 3,257,116
Patented June 21, 1966

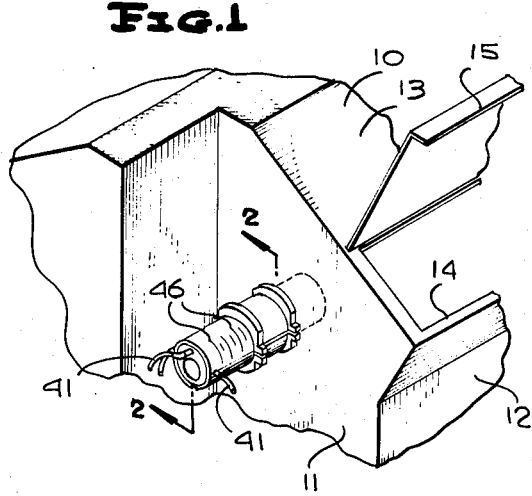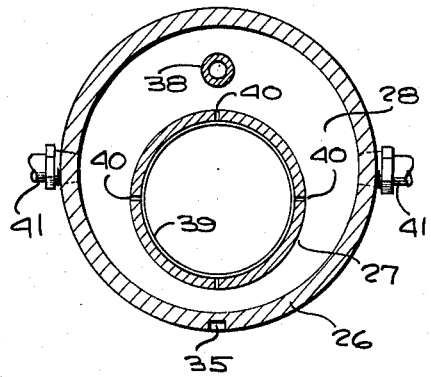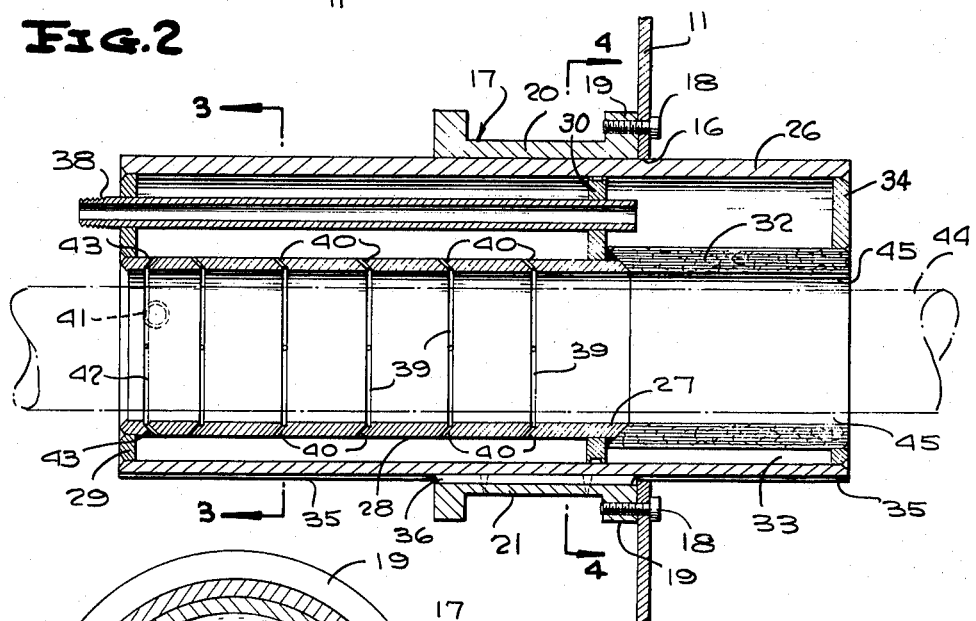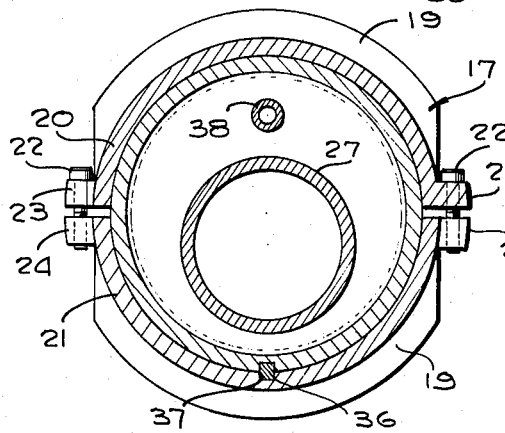

3,257,116
AIR SEAL STRUCTURE FOR INSTALLATION IN AN OPENING IN A WALL
Robert R. Sharetts, Reading, and Michael C. Siminski, Jr., Sinking Spring, Pa., assignors to The Polymer Corporation, a corporation of Pennsylvania
Filed Jan. 8, 1962, Ser. No. 164,924
20 Claims. (Cl. 277—70)

The present invention relates to pneumatic seal means for a vessel and more particularly to sealing means for a vessel which prevents material within the vessel from being discharged therefrom, and prevents external material from entering the vessel.

The present invention further relates to pneumatic seal means for use in a fluidized bed coating process, such as that described in U.S. Patent No. 2,974,059 and that described in copending application Serial No. 164,723 filed January 8, 1962.

It is an object of the present invention to provide pneumatic sealing means for a vessel in which an external member must be passed through an opening in the vessel and thereafter removed from the vessel.

It is another object of the present invention to provide pneumatic sealing means for an opening in the wall of an airtight vessel in which there is an air gap surrounding an object which must pass through the opening.

It is another object of the present invention to provide an air seal for an opening in the wall of a vessel through which an elongate object, such as a pipe, must pass so that the pipe extends beyond both sides of the wall opening.

It is another object of the present invention to provide air seal means for an opening in the wall of a vessel through which a pipe or like objects extend during manufacture or processing of the pipe.

It is another object of the present invention to provide an air seal means for an opening in the wall of a vessel through which a pipe extends to prevent pulverized material within the vessel from being discharged therefrom and to prevent dust and other contaminants outside of the vessel from entering it.

It is another object of the present invention to provide air seal means in an opening in the wall of a vessel through which a pipe extends for coating the exterior of the pipe by a fluidized bed coating process.

It is another object of the present invention to provide adjustable air seal means for an opening in the wall of a vessel through which a pipe extends while a manufacturing process is being performed on the pipe, so that the air seal means can be advanced into or moved out of the vessel, to regulate the distance that the pipe comes in contact with a fluidized bed in the vessel to control the time of contact of the pipe passing through the vessel with the fluidized bed and thus the resulting thickness of an applied coating of material to the pipe.

It is another object of the present invention to provide air seal means for an opening in the wall of a tank and container through which a pipe and like objects extend provided with air jet means which form a curtain or sheet of air around the pipe and opening to prevent discharge of material from the tank and entry of dust and dirt contaminants into the tank.

It is another object of the present invention to provide air seal means for an opening in the wall of a container through which a pipe extends in order to coat the pipe by a fluidized bed coating process, provided with nozzle means which direct jets of air simultaneously toward the interior of the tank and away from the tank so that fluidized material within the tank cannot escape, and dirt and contaminants on the outside of the tank cannot enter it.

It is a further object of the present invention to provide air seal means for the opening in the wall of a container through which a pipe extends for coating the pipe by a fluidized bed coating process having two separate sources of air so that the section which prevents escape of fluidized material, and the air jet section may be individually and separately controlled.

It is still another object of the present invention to provide air seal means for an opening in the wall of a container through which a pipe passes for coating the pipe by a fluidized bed coating process having an inner portion consisting of a porous material which enables fluidization of any powder that enters the seal and blows such powder back into the container, another section consisting of annular air jet means that direct stray powder back into the interior of the tank, and an outer section consisting of annular air jet means that are directed away from the interior of the tank to prevent atmospheric dust and dirt from being aspirated by the first mentioned annular air jet means back into the tank to contaminate the coating materials therein.

Various other objects and advantages of the present invention will be readily apparent from the following detailed description when considered in connection with the accompanying drawing forming a part thereof, and in which:

FIG. 1 is a fragmentary perspective view illustrating the air seal means of the present invention disposed on the wall of a vessel;

FIG. 2 is an enlarged side elevational section of the air seal means of the present invention, taken on the lines 2—2 of FIG. 1;

FIG. 3 is a transverse section taken on lines 3—3 of FIG. 2; and

FIG. 4 is a transverse section taken on lines 4—4 of FIG. 2.

Referring to the drawing, the reference numeral 10 designates a portion of a tank or vessel in which a pipe or other elongate body may be coated by a fluidized bed coating process as described in the above-mentioned copending application and the above-mentioned patent, which process per se does not form part of this invention. Only so much of the tank is here illustrated as is necessary to show and describe the association and coaction of the invention therewith.

The tank 10 has a front wall 11, a side wall 12 and a top 13 having an opening 14 therein with a hinged cover 15 for closing the opening.

The wall 11 is provided with a circular opening 16 therein leading into the interior area in which coating by a fluidized pulverulent material may taken place, and the opening 16 has split ring member 17 mounted around it on the outside of the wall be horizontal bolts 18 connected to the inner flange 19 of the split ring. The diameter of opening 16 and ring 17 is substantially the same. The ring 17 consists of an upper semi-circular portion 20 and a lower identical semi-circular portion 21 held together by vertical bolts 22 connected to laterally disposed threaded lugs 23 on ring section 20 and corresponding lugs 24 on ring section 21 so that the split ring member 17 can be adjusted to receive a sleeve member 26 therethrough. In mounting the sleeve member 26 in ring 17, the bolts 22 extending through the lugs 23 and 24 are loosened and the sleeve 26 is then inserted through the member 17, after which the bolts are then tightened to clamp the sleeve in the desired position. It is apparent that sleeve 26 can be advanced inwardly of wall 11 or moved outwardly of the wall by merely loosening the bolts 22 and sliding or moving the sleeve to its desired position with respect to the wall, after which the bolts are tightened so that the sleeve is then rigidly fixed in an immovable position.

Outer sleeve 26 has an inner sleeve or tube 27 disposed eccentrically therein (FIG. 4) which forms an annular chamber 28 with the outer sleeve 26. The outer end of the outer sleeve 26 is closed by an outer annular plate 29 secured thereto by welding or the like and encircling and secured to the inner sleeve to make the outer end of chamber 28 air tight. The inner portions of the sleeves adjacent the inner end of chamber 28 are secured together by an inner annular plate 30, similar to plate 29, to make the inner end of the chamber 28 air tight. The inner end of sleeve 27 has an air-permeable porous sleeve 32 of substantially the same inside diameter secured thereto by welding or the like to form an eccentric annular passage or inner end chamber 33 between sleeve 32 and the inner portion of outer sleeve 26. The inner end of chamber 33 is made air tight by an annular plate 34 encircling the inner end of inner sleeve 27 and secured to the inner end of sleeve 26 and to the adjacent end of sleeve 32 by any well known means. Sleeve 32 is an air permeable material and is preferably made of porous bronze material which may be made in a conventional sintering process or the like not forming part of this invention.

The outer sleeve 26 is provided with a longitudinal slot 35 (FIG. 3) in the outer surface thereof, and here shown as being at the bottom thereof, while lower half ring portion 21 of the ring clamp member 17 is also provided with a corresponding slot 36 (FIG. 4) therein. A key 37 is disposed in the complementary slots or keyways 35 and 36 to keep sleeve 26 from rotating with respect to clamp member 17 and also serves as a guide for advancing the sleeve inwardly into the tank, and outwardly from the tank to adjust the longitudinal position of the sleeve, when desired.

An air supply pipe or tube 38 extends through plates 29 and 30 above inner sleeve 27 for supplying air under pressure to the inner end chamber 33 of the inner fluidized section of the air seal. Air tube 38 is connected to a source of air supply above atmospheric pressure, not shown.

Sleeve 27 is provided with longitudinally spaced annular or circumferential recesses or grooves 39 in the inner periphery thereof connected to a plurality of spaced air jets or nozzles 40 which communicate with annular chamber 28. The nozzles 40, as can be seen in FIG. 2, are diagonally disposed in the sleeve in a direction extending toward wall 11. This portion of the air seal means comprises a middle or second air seal section that directs stray powder back into the interior of the tank by means of air under pressure in chamber 28 flowing through the jets 40 and into and across the annular recesses 39 around sleeve 27 to provide a circular curtain or screen of air under pressure therein. Air under pressure is supplied to chamber 28 through pipe connections 41 disposed on opposite sides of chamber 28, as best seen in FIG. 3. The pipe connections are in communication with a suitable source of air under pressure (not shown) through rubber hoses or by any other suitable means.

The extreme outer end of sleeve 27 is provided with a circumferential or annular recess 42 in the inner periphery thereof similar to recesses 39. The recess 42 communicates with a series of spaced air jets or nozzles 43 extending through the sleeve similar to the nozzles 40, except that they are directed in the opposite direction and are diagonally disposed to discharge in a direction away from wall 11 so that air flowing through the jets will direct a curtain or screen of air toward the outer end of sleeve 27, looking at FIG. 2, or away from wall 11. This comprises the third section of the air seal means which embodies the annular air jets 43 directed away from the interior of the tank. This is to prevent stray dust and any other contaminants in the air on the outside of the tank from being aspirated by the middle section of jets 40 back into the tank to contaminate the coating material therein.

The dot-dash lines extending through sleeve 27 in FIG. 2 represent the position of a pipe 44 extending through the air seal means and the opening in wall 11, which pipe is coated by a fluidized bed coating process as it is fed through the tank, which coating process and apparatus are more fully described in the abovementioned copending application and patent.

The pipe 44 in the coating process is inserted through sleeve 27 and supported in spaced relationship with the inner periphery of the sleeve by means, not shown and not forming part of the invention. The pipe is gradually fed through sleeve 27 in a direction from the left toward the right when looking at FIG. 2, so that the extreme left end of the pipe eventually passes through the opening in wall 11 and through the sleeve and is removed from the other side of the tank, not shown. The outside of the pipe is coated by fluidized material as it passes through the tank. It is necessary that the pipe be spaced from the inner periphery of sleeve 27 and that the pipe not touch anything as it passes through the tank so that the plastic material coating applied on the outside of pipe will not be wiped off, before it has had sufficient time to cool and harden. It is for this reason that some means must be provided to prevent the pulverized or granular coating material from blowing out of the opening in wall 11 and out of sleeve 27, as well as preventing dirt and contaminants from being introduced into the tank through the annular space 45 between the pipe and sleeve.

In the present invention, any material that is fluidized in the tank is prevented from blowing past the porous air permeable bronze sleeve 32 by air under pressure in chamber 33 which is at a greater pressure than the air in the tank so that it fluidizes any of the powder that attempts to enter the seal, and blows such powder back into the tank. It will also be observed that the air under pressure applied to chamber 33 through pipe 38 is independent of the other air supply means embodied in the invention. This means that if desired the air pressure surrounding sleeve 32 may be under a higher pressure if desired, than the air pressure in chamber 28 and permits very sensitive regulation thereof.

If any of the powder should leak or blow outwardly of sleeve 32, the air jets 40 provide a stream of air directed inwardly toward wall 11 to blow the powder back into the tank to thus provide an additional means of preventing leakage of pulverized material out of the tank through space 45.

It, of course, can be appreciated that the sectional view of FIG. 3 showing four jets 40 and annular recess 39 is for purposes of illustration only, and that other modifications are within the scope of the invention. Thus, with regard to any cross section of the sleeve 27, a plurality of spaced peripheral orifices can be used, or the longitudinally spaced annular or circumferential recesses or grooves 39 may extend entirely through the wall of sleeve 27 in a direction oblique to the longitudinal axis thereof. In this embodiment, the resulting annular slot, which would provide a stream or curtain of air in a direction toward wall 11, is spot welded at a few points about its circumference so that the sleeve 27 retains its unitary or continuous form in a lengthwise direction. A sleeve having such obliquely directed slots has been found particularly effective and can be used either alone or in combination with a plurality of spaced peripheral orifices. In like manner, the recess or groove 42 can extend obliquely entirely through the wall of sleeve 27 so that a stream or curtain of air will be directed toward the left of sleeve 27 or away from wall 11.

Also, if desired, the sleeve 27 can be made of a porous material throughout such as sintered metal to produce a fluidization of the powdered material, in addition to the effect of the air jets.

With reference to the outer air seal means 42 and 43, adjacent the outer end of sleeve 27 these jets direct a stream of air or other gas under pressure outwardly in a direction away from wall 11 to prevent any dust or other contaminants in the air from entering the tank to contaminate the coating powder.

It will thus be apparent from the above description, the invention provides novel air seal means having an inner section, a middle section and an outer section for preventing leakage of powdered material or other discrete substance from a tank under pressure through which a pipe or other like objects are passed, to provide a continuous coating on the outside of the pipe as it is passed therethrough.

Another feature of the invention is the fact that the air seal means can be readily axially adjusted to advance the air seal means into the tank or to pull it out of the tank to regulate the distance that the pipe comes in contact with the fluidized bed, and with a fixed rate of feed of pipe through the bed, enables control of the detention time, or the time of contact of the pipe with the fluidized material, and thus controls the thickness of the applied coating, without requiring altering the feed mechanism of the pipe. The sleeve 27 is provided with circular spaced graduations 46 (FIG. 1) to easily mark off the proper setting of the sleeve 26 laterally of ring member 17 and the tank 10.

The invention also provides separate air supply means for different parts of the air seal means so that the air seal around the outer periphery of the pipe may have a higher air pressure adjacent the wall of the tank than at a distance farther removed therefrom if desired, or vice versa.

Inasmuch as various changes may be made in the form, location and relative arrangement of the several parts without departing from the essential characteristics of the invention, it will be understood that the invention is not to be limited except by the scope of the appended claims.

We claim:

1. An air seal structure for installation in an opening in a wall, such structure comprising an elongate outer sleeve, an elongate inner sleeve therein and extending longitudinally therethrough, annular closure partitioning plates between adjacent end portions of said sleeves and sealingly secured to the sleeves and forming therewith an elongate annular air chamber between the sleeves, means for introducing air under pressure into said chamber, and means for discharging air from said chamber in the form of an annular curtain through the wall of and to the interior of said inner sleeve to envelop in the air a body positioned axially of and within the inner sleeve.

2. An air seal structure for installation in an opening in a wall structure, said seal structure comprising an elongate outer sleeve, an elongate inner sleeve therein and extending longitudinally therethrough, partition means between and sealingly joined to the inner and outer sleeves forming therewith two annular air chambers around the inner sleeve, the inner sleeve only being open at its ends, means for introducing air under pressure into each chamber, means for permitting air to pass in jets through a portion of the wall of the inner sleeve from one chamber, and means for passing air in a diffused state through another portion of the wall of the inner sleeve from the other chamber.

3. The invention as defined by claim 2, wherein the last named means forms an end portion of the inner sleeve.

4. An air seal structure for installation in an opening in a wall structure, said seal structure comprising an elongate outer sleeve, an elongate inner sleeve therein and extending longitudinally thereof, partition means between and sealingly joined to said sleeves forming therewith two separate annular chambers, means for introducing air into both chambers, a portion of said inner sleeve consisting of an air-permeable porous material for permitting passage of air from one chamber thereinto, and another portion of said inner sleeve being provided with air jet passages extending through the wall thereof to permit air under pressure to flow thereinto from the other chamber.

5. An air seal structure for installation in an opening in a wall separating an air pressurized area from an area of different air pressure, comprising in combination an annular mounting member, means for mounting said annular member on said wall concentrically with the said opening, an elongate outer sleeve disposed in said annular member, means for rigidly securing said sleeve in an operative position with respect to said member, an elongate inner sleeve within the outer sleeve, partitioning means between and sealingly joined to both sleeves to form an air chamber adapted to receive air under pressure, and means forming a part of the structure of said inner sleeve for passing air from said chamber into the inner sleeve to form an air seal between the inner side thereof and a body positioned therein.

6. An air seal structure comprising in combination, a mounting ring, spaced elongate inner and outer sleeves disposed one within the other, annular partitioning means surrounding the inner sleeve and having sealing connection with both sleeves to form an annular air chamber, said inner sleeve having open ends, said sleeves being slidably positioned as a unit in said mounting ring, adjustable means for rigidly connecting said sleeves as a unit in a fixed position with respect to said ring, air jet means in said inner sleeve for directing a stream of air in one direction thereinto from said air chamber, other air jet means in said inner sleeve for directing a stream of air thereinto from said air chamber and in an opposite direction from the first stream, and other means forming a part of said inner sleeve for directing diffused air thereinto from a source through a predetermined portion of the wall of said inner sleeve.

7. The combination as defined by claim 6, wherein one of said air jet means is located adjacent to one end of said inner sleeve, the other air jet means being located adjacent to and inwardly of said one air jet means, and the said other means forming a part of said inner sleeve being disposed upon the side of said other air jet means remote from said one air jet means in the longitudinal direction of the inner sleeve.

8. A pneumatic seal structure comprising in combination, a split ring member, an outer sleeve member slidably disposed in said ring member, means for tightening said ring member around and to prevent movement of said outer sleeve therein, an inner sleeve within and in spaced relation with the outer sleeve, plate means encircling the inner sleeve and in sealing connection with and connecting the sleeves together to form an air chamber therebetween, air jet means spaced around the periphery of said inner sleeve and connected with said air chamber for directing a curtain of air in one direction into and around the inner periphery of the inner sleeve, other air jet means spaced around the periphery of said inner sleeve and connected with said air chamber for directing a curtain of air into and around the inner periphery of the inner sleeve in the opposite direction to said first mentioned air jet means, a cylindrical porous air-permeable member having an end connected to an end of and forming a continuation of said inner sleeve, said cylindrical member being within and spaced from said outer sleeve, plate means encircling said cylindrical member and in sealing connection with said member and the outer sleeve to form another air chamber from which air flows through said permeable member into the inner sleeve.

9. A pneumatic air seal structure adapted to be mounted in an opening in a wall structure, said seal structure having a substantial length and having an outer end and an inner end, said inner end being designed to project through a wall structure opening to an inner side of the wall structure, the seal structure comprising an outer tubular sleeve and an inner tubular sleeve of smaller exterior diameter than the interior diameter of the outer sleeve within which it is located, the inner sleeve embodying two end-to-end opposed aligned parts, annular plates encircling the inner and outer ends of the inner sleeve and sealingly joining the latter to the outer sleeve, an intermediate annular plate encircling the inner sleeve and sealingly joining the latter to the outer sleeve, the inner end plate and the intermediate plate forming with the sleeves an air chamber around an inner end portion of the inner sleeve, the outer end plate and the intermediate plate forming with the sleeves an air chamber around an outer end portion of the inner sleeve, means for introducing air under pressure into each chamber, the said inner end portion of the inner sleeve being formed of air-permeable material and the said outer end portion of the inner sleeve having longitudinally spaced air jet passages therethrough leading from the second mentioned air chamber and arranged to direct air streams into and through the inner sleeve in the general direction of the inner end thereof, there being other air jet passages through the said outer end portion of the inner sleeve at the outer end of such portion leading from said second mentioned air chamber and arranged to direct air streams into and toward the adjacent end of the inner sleeve, and means for mounting the air seal structure on a supporting wall structure with said inner end of the seal structure directed through an opening in the wall structure.

10. A pneumatic air seal structure as defined by claim 9, wherein the last said means comprises a split ring encircling the seal structure and formed to be constricted around the seal structure against the outer sleeve, and means for securing the split ring to the surface of such wall structure in encircling relation with the said opening.

11. The invention as defined by claim 10, with a key coupling between said split ring and said outer sleeve and extending longitudinally of the seal structure for preventing rotational movement of the seal structure in the split ring while permitting longitudinal movement thereof in the ring.

12. The air seal structure of claim 1, wherein the last said means comprises a plurality of air jet passages exiting through said wall of the inner sleeve.

13. The air seal structure of claim 1, wherein a portion of said inner sleeve consists of porous air-permeable material.

14. The combination of claim 5, wherein said means for passing air from the said chamber into the inner sleeve consists of oppositely directed air jet passages in the wall of the inner sleeve, and a portion of said inner sleeve consists of air-permeable porous material.

15. The combination of claim 8, wherein said air jet means are spaced apart longitudinally of said inner sleeve and separate air supply means are connected to said air chambers.

16. The combination with a wall having an opening therein, of a pneumatic seal structure comprising a split ring member bolted to said wall adjacent to and concentric with said opening, an outer sleeve slidably disposed in said ring member and extending through said ring member, adjustable clamp means for tightening said ring member about said outer sleeve to hold said outer sleeve against movement therein, an inner sleeve spaced within said outer sleeve, plate means spaced longitudinally of and sealingly connected to and between the sleeves to form an annular air chamber therebetween, air jet means around the periphery of the inner sleeve and connected with said air chamber for directing a curtain of air in one direction into the inner sleeve, other air jet means around the periphery of the inner sleeve and connected with said air chamber for directing a curtain of air into the inner sleeve in a direction opposite to the first stated air jet means, said inner sleeve including an air-permeable cylindrical porous section at one end thereof and spaced from said outer sleeve, one of said plate means being intermediate the ends of said inner and outer sleeves whereby another air chamber is provided which encircles the porous member, whereby air may pass from said another chamber through said porous member into the inner sleeve.

17. The combination of claim 16 with an air supply pipe extending longitudinally through the first said air chamber from exteriorly of the structure at the end thereof remote from said porous member into said another chamber, and means for supplying air to the first said air chamber whereby to control separately the air pressure in said chambers.

18. The combination of claim 16, wherein said inner sleeve is eccentrically disposed in said outer sleeve, and key means couples the outer sleeve with said ring member for preventing rotation of said sleeves with respect to said ring member while permitting axial movement of the structure relative to the ring member.

19. An air seal structure for installation in a wall opening, comprising spaced inner and outer elongate sleeves, partitioning means between and spaced apart longitudinally of the sleeves and surrounding the inner sleeve and sealingly joined to the sleeves and forming an air chamber therebetween, the inner sleeve being open at its ends, means for introducing air under pressure into the chamber, and means for passing air from the chamber through the wall of said inner sleeve throughout the length of the latter to envelop in the air an elongate body extending through the inner sleeve.

20. An air seal structure for installation in an opening in a wall for preventing passage of airborne materials through the opening while an elongate body is being moved through the opening, said seal structure comprising an elongate outer sleeve, an inner sleeve disposed therein in spaced relationship therewith, partitioning means between and spaced apart longitudinally of the sleeves and surrounding the inner sleeve and sealingly joined to the sleeves and forming a gas chamber around the inner sleeve, means for introducing a gas under pressure into the chamber, means for permitting movement of the gas from the chamber through the wall of the inner sleeve to the interior of the latter to form a gas seal around a body extending through the inner sleeve, and means for mounting the structure in gas tight connection with the edge of a wall opening with which the structure is axially aligned.

References Cited by the Examiner
UNITED STATES PATENTS

| | | |
|---|---|---|
| 1,643,330 | 9/1927 | Barord. |
| 1,682,823 | 9/1928 | Barord. |
| 2,564,599 | 8/1951 | Hapman _____ 34—242 X |
| 3,060,304 | 10/1962 | Tanaka. |
| 3,106,491 | 10/1963 | Leibner _____ 118—58 |
| 3,108,022 | 10/1963 | Church. |
| 3,138,483 | 6/1964 | Dettling et al. _____ 117—21 |
| 3,142,579 | 7/1964 | Brooks _____ 117—21 |

RICHARD D. NEVIUS, *Primary Examiner.*

R. E. ZIMMERMAN, A. H. ROSENSTEIN,
*Assistant Examiners.*